Sept. 13, 1960

H. D. GULNAC ET AL 2,952,800

TIME DELAY DEVICE

Filed Nov. 7, 1957

INVENTORS
HOWARD D. GULNAC AND
FRANCIS D. GREENLEAF
BY
Wade Koontjou
Sherman H. Goldman
ATTORNEYS

United States Patent Office 2,952,800
Patented Sept. 13, 1960

2,952,800

TIME DELAY DEVICE

Howard D. Gulnac, Phoenix, Ariz., and Francis D. Greenleaf, Syosset, N.Y., assignors to the United States of America as represented by the Secretary of the Air Force Filed Nov. 7, 1957, Ser. No. 695,182

6 Claims. (Cl. 317—142)

This invention relates generally to a time delay system and more particularly to an electronic system for delaying the closing of a contact group a given period of time after activation of a circuit.

The time circuit technique of this invention is general in application and may be applied to military electronic equipment. For example the circuitry described in the figures may be used in the Teleran (Television Radar Air Navigation) Beacon.

Accomplishment of rapid recycling for delaying a contact group a given time after activation of a circuit is achieved by utilizing a discharging device or switching tube which is held to cutoff until a capacitor can be charged.

An object of this invention, therefore, involves the provision of a circuit capable of rapid recycling for accurately delaying the closing of a contact group a given time after activation of the circuit.

Another object of the invention is to provide a time delay device which utilizes conventional, currently available components that lend themselves to standard mass production manufacturing techniques.

Figure 1:
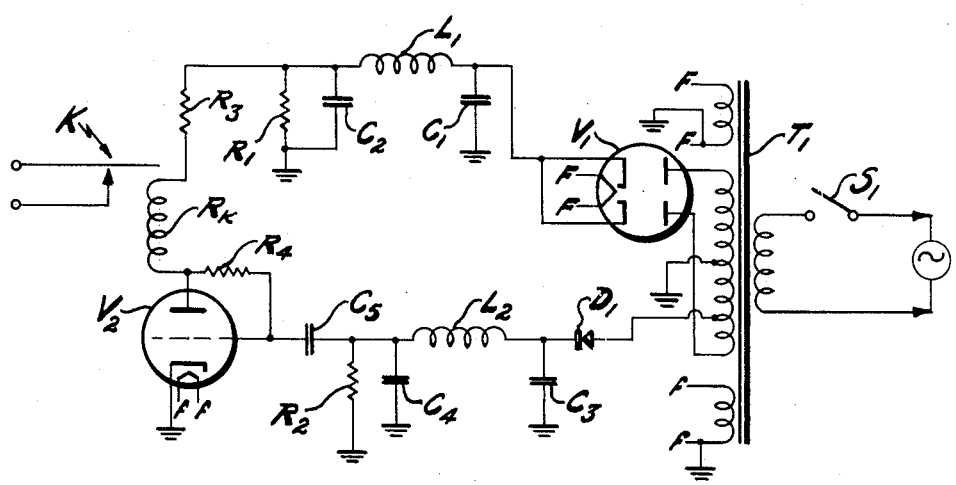
Figure 2:
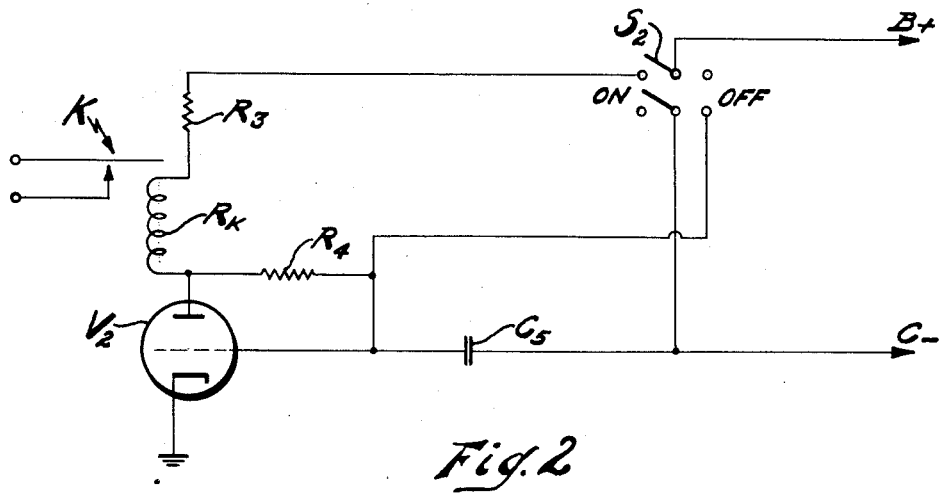

These and other advantages, features and objects of the invention will become more apparent from the following description taken in connection with the illustrative embodiments in the accompanying drawings, wherein:

Fig. 1 is a circuit diagram of a time delay device capable of rapid recycling for delaying the closing of a contact group a given time after circuit activation; and Fig. 2 is a circuit diagram of an alternative embodiment for rapid recycling which has a constant recycling delay.

In the figures, like numerals designate like parts in the separate embodiments.

Referring to Figure 1, a switch $S_1$ is provided for the primary winding of a transformer $T_1$ to control the application of a source of alternating current to said winding. The center tapped secondary winding of $T_1$ is connected, as shown, to each of the plates of dual diode $V_1$ which acts as a full wave rectifier. A capacitor input pi filter, comprising capacitors $C_1$, $C_2$ and inductor $L_1$, filters the output from $V_1$ to provide the B+ voltage across load resistor $R_1$. A tap on the secondary of transformer $T_1$ allows the application of a voltage to a rectifier $D_1$ which may be of the selenium oxide type. The output from the selenium rectifier $D_1$ is filtered by a capacitor input pi filter, comprising capacitors $C_3$, $C_4$ and inductor $L_2$, and develops the C— or bias voltage across load resistor $R_2$. A resistor $R_3$ and windings $R_k$ of a relay K having a contact group associated therewith, are placed in series with the B+ voltage and are connected with the plate of tube $V_2$. The plate of $V_2$ is connected through resistor $R_4$ with the grid of $V_2$ and through a capacitor $C_5$ with the bias voltage.

When the switch $S_1$ is closed the transformer $T_1$ applies a voltage to the diode $D_1$ such that the bias or C— voltage is generated almost instantly; however, the B+ voltage rises slowly due to the slow heating of rectifier $V_1$ filaments.

Since $R_3$, $R_k$ and $R_4$ are in series with $C_5$ and are placed across the B+ and C— voltage sources, the grid of tube $V_2$ will be negative, thus holding the tube at cutoff. The voltage drop across $R_3$, $R_k$ and $R_4$ gradually reduces during the charging period of $C_5$ until the cutoff voltage of $V_2$ is passed. When $V_2$ begins to conduct, the voltage drop across $R_3$ and $R_k$ lowers the voltage towards which $C_5$ is charging and acts to prolong the duration of the time-delay interval that elapses while the negative feedback into tube $V_2$ is retarding the plate current build-up in said tube. The contacts of the relay K are actuated when sufficient plate current is permitted to flow, which occurs at a time dependent upon the tube and circuit elements chosen.

Opening of the switch $S_1$ causes a rapid disappearance of the bias voltage thereby forcing $C_5$ to discharge through the grid of $V_2$ and resistor $R_2$ which prepares the circuit to provide a delay upon the next actuation of $S_1$. The time delay on rapid recycling will not be as long as from a cold start since the extra delay due to the slow rise of the B+ voltage will be eliminated.

The circuit of Figure 2 eliminates the variation in delay caused by the gradual heating of the filaments of $V_1$. In this embodiment both the B+ and C— voltages are applied continuously and recycling control is obtained by double-pole-double-throw switch $S_2$. Placement of $S_2$ in the On position allows the circuit to behave in a similar manner to the embodiment in Figure 1 with the exception that the B+ voltage is applied instantaneously while the C— voltage is continuously applied, thus, no variation in recycling delay results. Movement of $S_2$ to its Off position provides a shorting path for discharge of capacitor $C_5$. Adjustment of the delay may be provided by utilizing variable resistors for $R_3$ and $R_4$ in either of the embodiments.

Although the invention has been described with reference to particular embodiments, it will be understood to those skilled in the art that the invention is capable of a variety of alternative embodiments within the spirit and scope of the appended claims.

We claim:

1. An electronic time delay device capable of rapid recycling, comprising a first source of positive voltage, a second source of negative voltage, an electron tube having an anode, a control grid and a cathode, a relay connected in series with said anode and said first voltage source, said relay operating responsive to the flow of current in said tube, and a charging circuit comprising the resistance in said plate circuit, a capacitor and a resistor, said resistor being connected between the anode and control grid of said tube, said capacitor being connected with said control grid and said second voltage source and means connecting said cathode with ground potential.

2. A relay control apparatus comprising an electron tube having an anode, a cathode and a grid for controlling the current conduction of said tube, a relay in series with said anode, a source of positive potential, switch means for controlling the application of said positive potential to said relay, a source of negative potential, an RC network including the resistance of the anode circuit of said tube connected with said negative potential source and a capacitor co-operating with said anode circuit resistance to cause negative feedback to be applied to said control grid to hold said tube at cutoff until the C portion of said RC circuit charges to change the grid bias and allow tube current flow thereby actuating said relay and means connecting said cathode with ground potential.

3. In a relay control device the combination of a tube having an anode, a control grid and a cathode, a relay having contacts which are actuated by current flow through said relay in the anode circuit of said tube, an RC circuit including the resistance in said anode circuit, a source of positive electromotive force, means for controlling application of said positive electromotive force to said anode circuit, a source of negative electromotive force, a portion of said RC circuit including a resistor connected between the plate and grid of said tube and a capacitor connected between said grid and said negative electromotive force source such that upon application of said positive electromotive force by its control means, said tube is held at cutoff until said capacitor charges through the anode circuit resistances to the cutoff voltage of said tube, the time delay being drawn out due to inverse feedback and means for connecting said cathode with ground potential.

4. The combination according to claim 3 including means for providing a discharge path for said capacitor upon removal of said positive electromotive force.

5. A device as defined in claim 3 wherein said positive electromotive force source comprises a transformer supplied rectifier and said means for controlling the application of the positive electromotive force comprises a switch in said transformer primary circuit.

6. A device as defined in claim 3 wherein said negative electromotive force source is a transformer supplied selenium rectifier.

References Cited in the file of this patent

UNITED STATES PATENTS

| | | |
|---|---|---|
| 2,752,511 | Beaufoy | June 26, 1956 |
| 2,818,532 | Aitel | Dec. 31, 1957 |
| 2,835,849 | Biedermann et al. | May 20, 1958 |